(12) United States Patent
Kubo

(10) Patent No.: US 7,574,124 B2
(45) Date of Patent: Aug. 11, 2009

(54) ADAPTER LENS

(75) Inventor: Takashi Kubo, Kanagawa (JP)

(73) Assignee: Sony Corporation (JP)

( * ) Notice: Subject to any disclaimer, the term of this patent is extended or adjusted under 35 U.S.C. 154(b) by 355 days.

(21) Appl. No.: 11/707,440

(22) Filed: Feb. 16, 2007

(65) Prior Publication Data
US 2007/0196090 A1 Aug. 23, 2007

(30) Foreign Application Priority Data
Feb. 20, 2006 (JP) ............................. P2006-042846

(51) Int. Cl.
G03B 17/00 (2006.01)
(52) U.S. Cl. ......................................... 396/71; 348/360
(58) Field of Classification Search ................. 396/71, 396/25–29, 530; D16/136; 348/81, 360, 348/373
See application file for complete search history.

(56) References Cited

U.S. PATENT DOCUMENTS 4,666,274 A * 5/1987 Maeno et al. .................. 396/29
7,489,359 B2 * 2/2009 Fukumoto et al. ........... 348/360
2005/0163494 A1 7/2005 Fukumoto et al.

FOREIGN PATENT DOCUMENTS

JP 2004-264367 A 9/2004

* cited by examiner

Primary Examiner—Christopher Mahoney
(74) Attorney, Agent, or Firm—Lerner, David, Littenberg, Krumholz & Mentlik, LLP

(57) ABSTRACT

An adapter lens has a front plate, an optical member, a side plate, an upper plate and a rear plate. The adapter lens can be detachably attached to an upper left-hand corner of a body included in a camera. The adapter lens is mounted on the camera with the front plate, the side plate, the upper plate and the rear plate in contact with a part of the front surface around the objective lens, an upper part of the side surface near the corner of the body, a part of the upper surface near the corner of the body, and an upper part of the rear surface near the corner of the body, respectively. A screw is passed through a through hole formed in connecting part of the rear plate and screwed into a threaded hole formed in a boss formed integrally with the side plate to hold the body between the front plate and the rear plate.

11 Claims, 20 Drawing Sheets

ADAPTER LENS

CROSS REFERENCES TO RELATED APPLICATIONS

The present invention contains subject matter related to Japanese Patent Application JP 2006-042846 filed in the Japanese Patent Office on Feb. 20, 2006, the entire contents of which being incorporated herein by reference.

BACKGROUND OF THE INVENTION

The present invention relates to an adapter lens.

Some camera, such as a digital still camera, is designed to change the magnification of its objective lens for wide-angle photography or telephotography by screwing a conversion lens into an internally threaded end part of the lens barrel of the objective lens.

Small cameras having a thin, rectangular body have been provided in recent years. The lens barrel of such a small camera does not have an internally threaded end part and hence an adapter lens, such as a conversion lens, cannot be attached to the lens barrel.

A lens adapter proposed in JP-A 2004-264367 has an adapter attached to the body of the camera, and a cylindrical barrel attached to the adapter, having a cylindrical wall surrounding the lens barrel and an internally threaded front end part. A conversion lens is screwed into the internally threaded front end part of the adapter.

SUMMARY OF THE INVENTION

This known lens adapter has a case that extends over front, upper, rear and lower surfaces of a side part of the body. Therefore, the lens adapter, as compared with the small cameral having the thin, rectangular body, is large. Consequently, the assembly of the small camera and the lens adapter is large and is not easy to handle.

When the objective lens is disposed in an upper corner of the front surface of the body, the case of the lens adapter covers a wide area excluding an area in which the objective lens is disposed. The external appearance of the lens adapter covering such a wide area is aesthetically unsatisfactory.

The present invention has been made in view of such a problem and the present invention desires to provide a lens adapter easy to handle and having aesthetically satisfactory external appearance.

According to an embodiment of the present invention, there is provided an adapter lens capable of being detachably attached to an upper corner of a thin, rectangular body included in a camera provided with an objective lens disposed in the upper corner of a front wall of the body, and including: a front plate capable of being brought into contact with a part of the front wall of the body around the objective lens; an optical member attached to the front plate; a side plate connected to a side part of the front plate and capable of being brought into contact with an upper part of the side surface of the body near the upper corner; an upper plate connected to an upper part of the front plate and capable of being brought into contact with a part of the upper surface of the body near the upper corner; and a rear plate connected to a rear part of the upper plate so as to be swingable and capable of being brought into contact with an upper part of the rear surface of the body near the upper corner; wherein a side part of the front plate opposite the side plate, a side part of the upper plate and a side part of the rear plate define a side opening opening in a lateral direction, a lower part of the front plate, a lower part of the side plate and a lower part of the rear plate define a lower opening opening downward, the front plate is brought into contact with a part of the front surface of the body around the objective lens, the side plate is brought into contact with an upper part of the side surface of the body, the upper plate is brought into contact with a part of the upper surface of the body near the upper corner, and the rear plate is brought into contact with an upper part of the rear surface of the body near the upper corner when the lens adapter is mounted on the camera, the optical axis of the optical member is aligned with the optical axis of the objective lens when the adapter lens is mounted on the camera, the side plate is provided with a laterally projecting boss provided with a threaded hole in its rear surface, the rear plate has a joining part which coincides with the boss when the adapter lens is mounted on the camera, and a screw is screwed through the opening of the joining part into the threaded hole of the boss to hold the lens adapter on the camera.

The adapter lens of the embodiment of the present invention is attached to only the upper corner of the body of the camera. Therefore, the adapter lens attached to the camera does not excessively increase the size of the camera and hence the camera is easy to use.

The adapter lens not uselessly covering parts of the body of the camera other than the upper corner of the body in which the objective lens is disposed is compact and has an aesthetically satisfactory appearance.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

First Embodiment

Figure 1A:
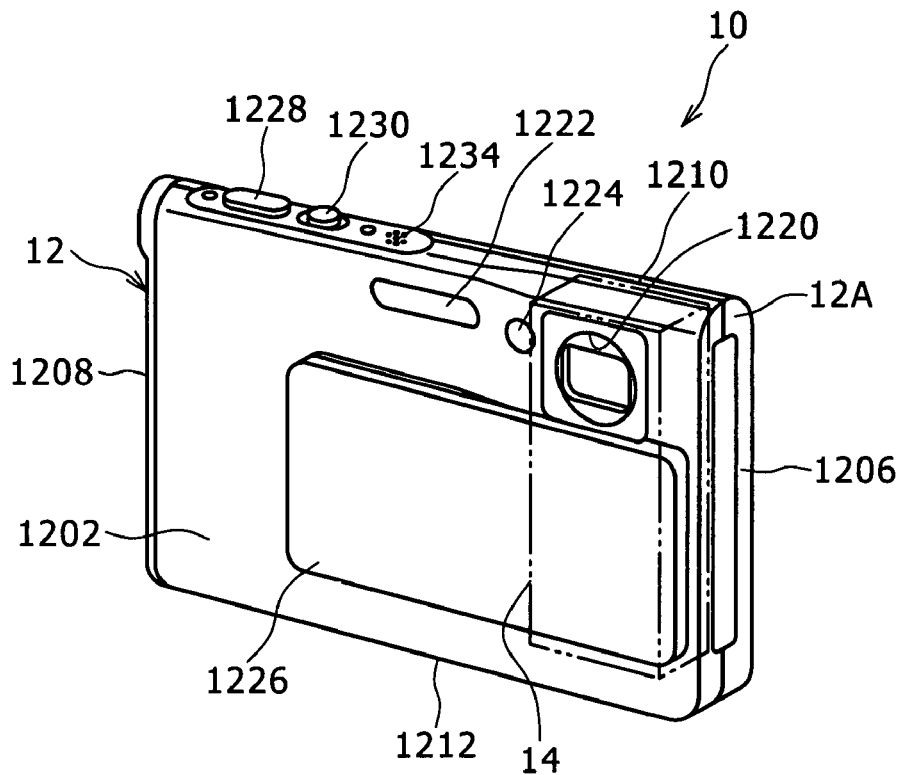
FIG. 1A is a front perspective view of a camera on which an adapter lens in a first embodiment according to the present invention is mounted.
Figure 1B:
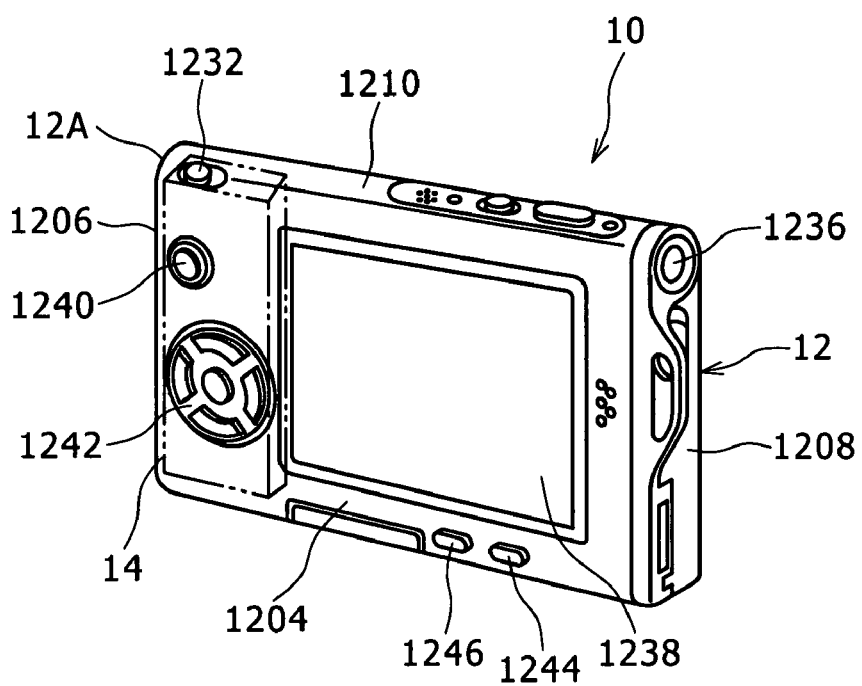
FIG. 1B is a rear perspective view of the camera shown in FIG. 1A.
Figure 2:
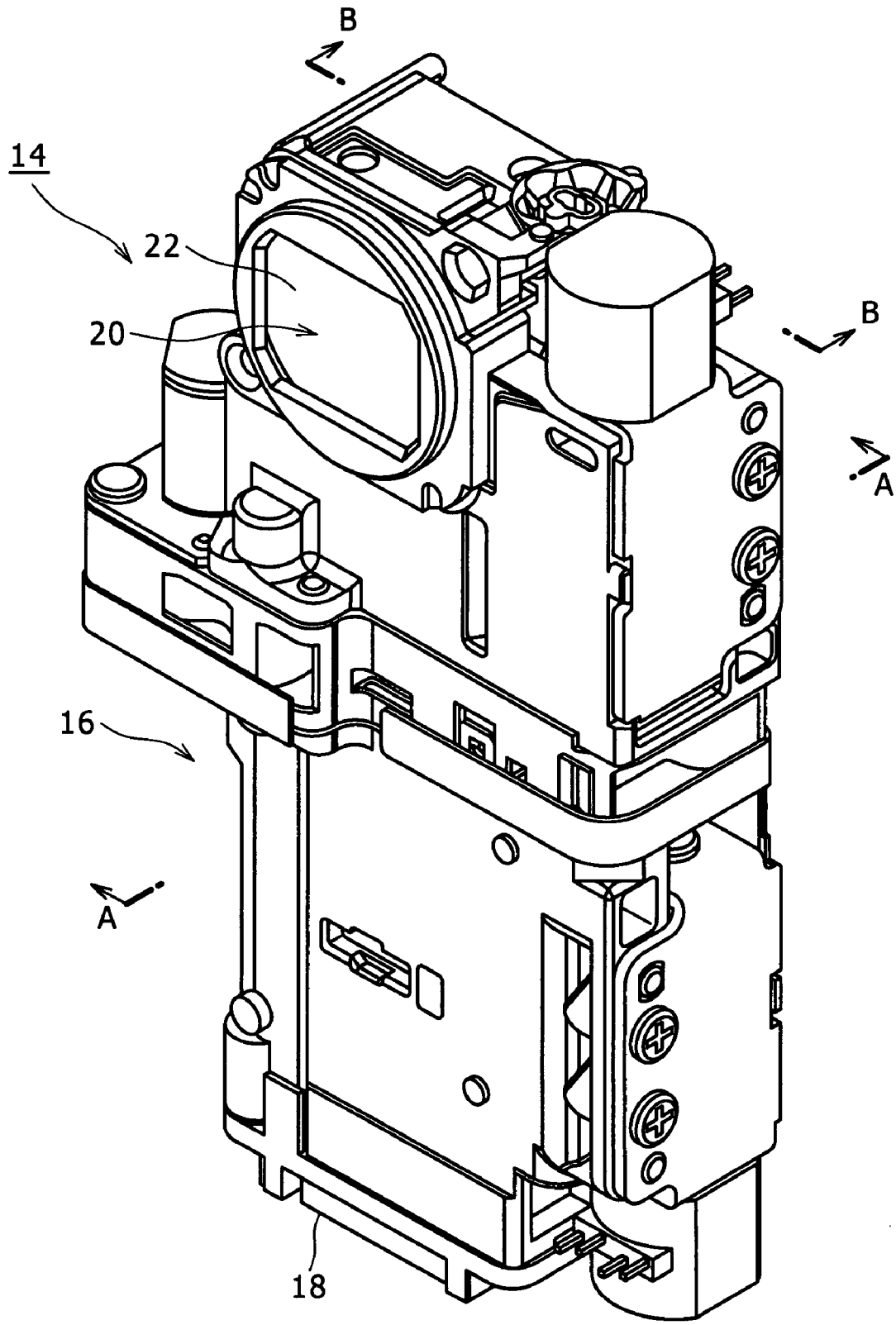
FIG. 2 is a perspective view of a lens barrel included in the camera shown in FIG. 1A.
Figure 3:
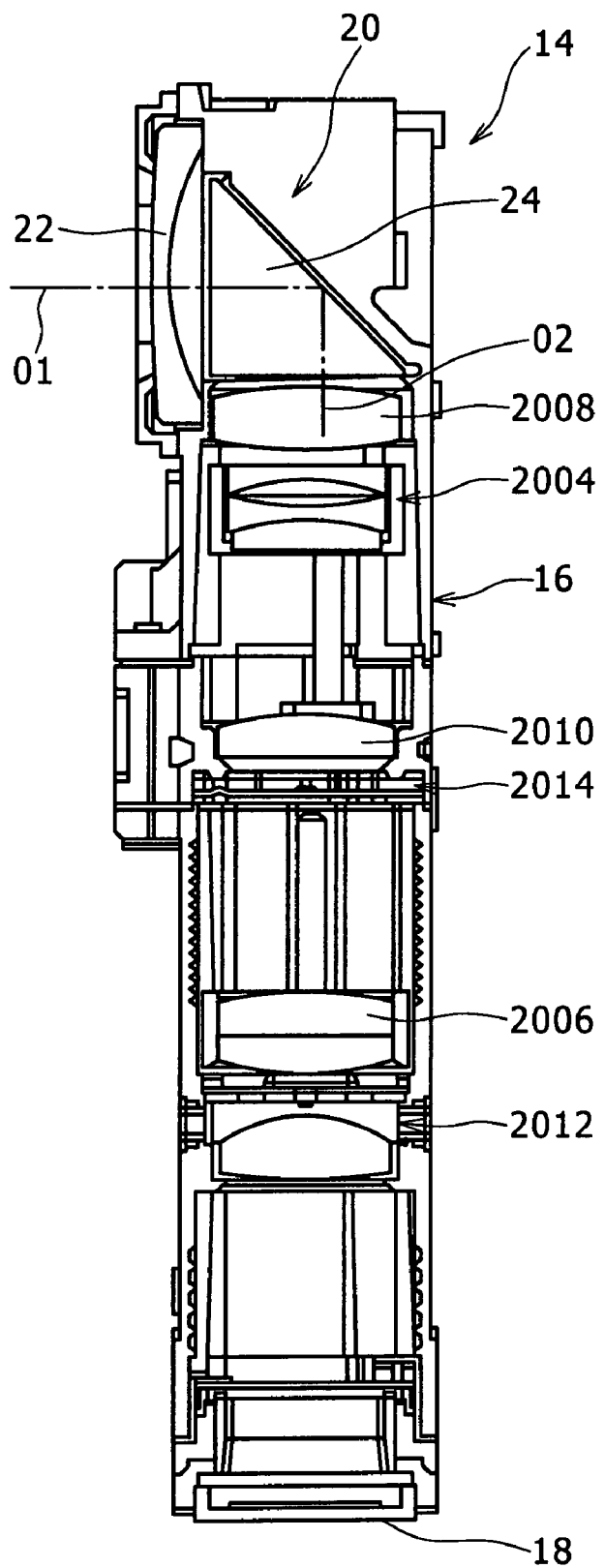
FIG. 3 is a sectional view taken on the line A-A in FIG. 2.
Figure 4:
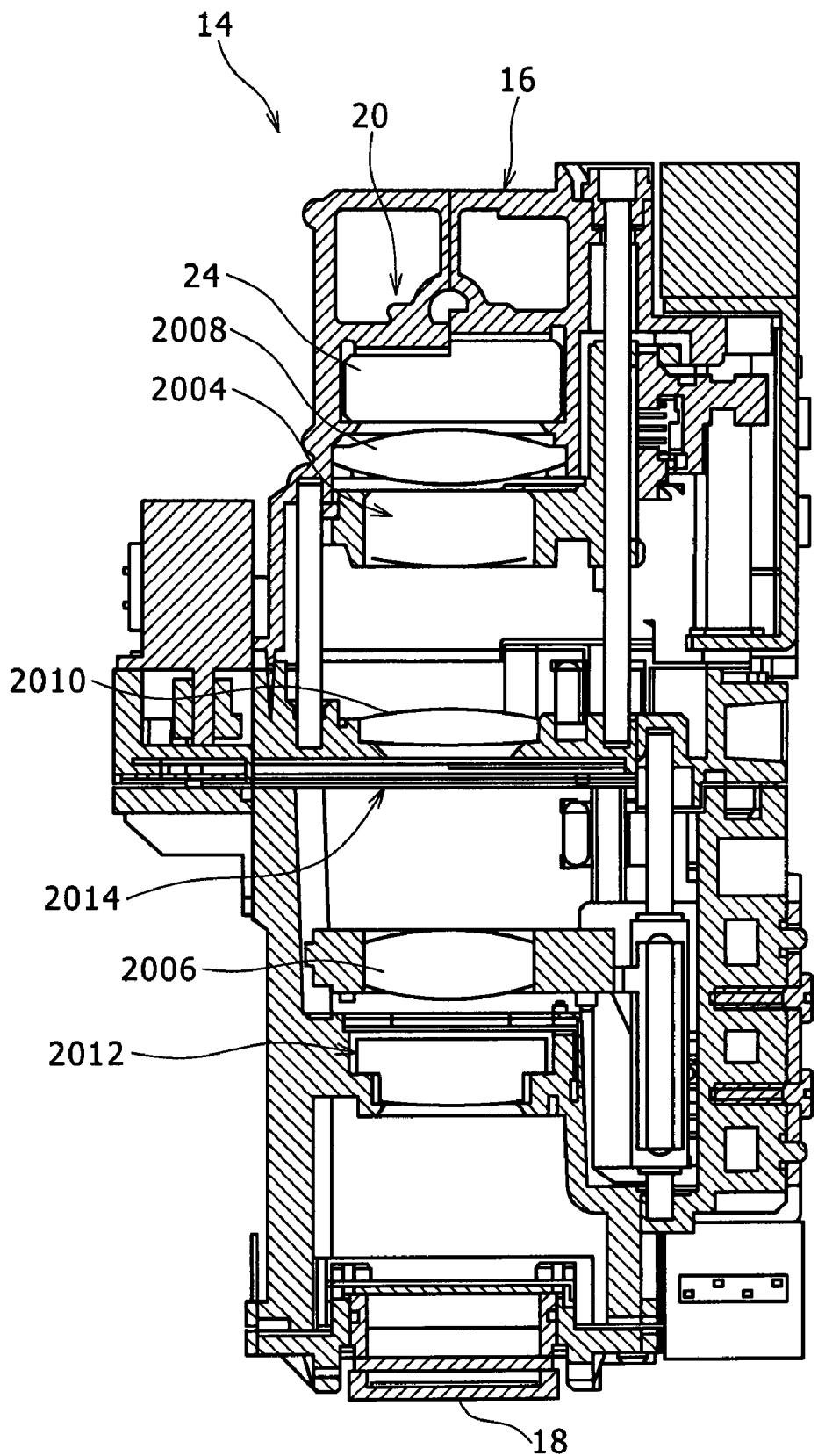
FIG. 4 is a sectional view taken on the line B-B in FIG. 2.
Figure 5:
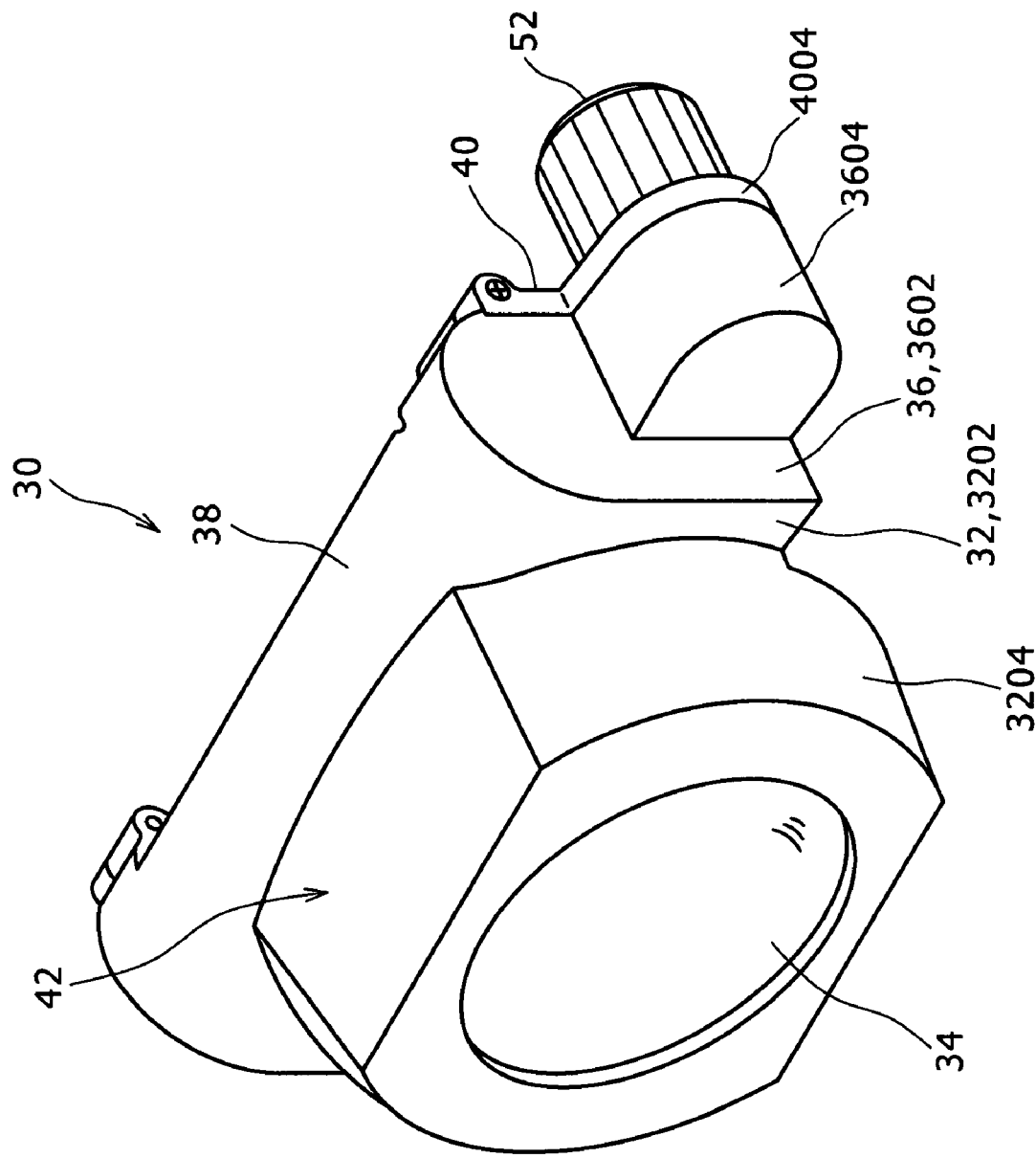
FIG. 5 is a perspective view of the adapter lens in the first embodiment.

FIG. 1A is a front perspective view of a camera 10 on which an adapter lens 30 in a first embodiment according to the present invention is mounted, FIG. 1B is a rear perspective view of the camera 10, FIG. 2 is a perspective view of a lens barrel 14 included in the camera 10, FIG. 3 is a sectional view taken on the line A-A in FIG. 2, and FIG. 4 is a sectional view taken on the line B-B in FIG. 2.

The camera 10 mounted with the adapter lens 30 will be described. In the following description, a side of the camera 10 on the side of an object is the front side, a side of the camera 10 opposite the front side is the rear side, a side on the right side of the camera 10 as viewed from behind the camera 10 is the right side, and a side on the left side of the camera 10 as viewed from behind the camera 10 is the left side.

Referring to FIGS. 1A and 1B, the camera 10 is a digital still camera having a thin, rectangular body 12 serving as a casing. The body 12 has a small thickness, namely, a longitudinal dimension, a height, namely, a vertical dimension, greater than the thickness, and a width, namely, a lateral dimension, greater than the height. The body 12 has a front surface 1202, a rear surface 1204, a right side surface 1208, a left side surface 1206, an upper surface 1210, and a lower surface 1212. The front surface 1202, the rear surface 1204, the side surfaces 1206 and 1208, and the lower surface 1212 are flat. The upper surface 1210 is a cylindrical surface having a lateral axis.

A lens barrel 14 is incorporated into a left side part of the body 12 as indicated by two-dot chain lines in FIGS. 1A and 1B. As shown in FIGS. 2 to 4, the lens barrel 14 includes a barrel 16, an image pickup device 18 combined with the barrel 16, and a photographic optical system 20 combined with the barrel 16. The photographic optical system 20 forms an image of an object on the image pickup device 18. The photographic optical system 20 is provided with an objective lens 22. As shown in FIG. 1A, the objective lens 22 is disposed in a lens window 1220 formed in an upper, left-hand corner 12A of the front surface 1202 of the body 12 so as to face forward.

An electronic flash lamp 1222 for stroboscopic photography and a self-timer pilot lamp 1224 are disposed in an upper middle part of the front surface 1202 of the body 12. A barrier 1226 can slide vertically on the front surface 1202 of the body 12 between a lower position for uncovering the lens window 1220, the electronic flash lamp 1222 and the self-timer pilot lamp 1224 and an upper position for covering the lens window 1220, the electronic flash lamp 1222 and the self-timer pilot lamp 1224.

Arranged in a right-hand part of the upper surface 1210 of the body 12 are a shutter button 1228 to be operated to open the shutter, a zoom lever 1230 for adjusting the focal length of the photographic optical system 20, and a microphone 1234 which is actuated by sound signals and provides equivalent electric signals. A mode selector switch 1232 for selecting either of a still picture photographing mode and a motion picture photographing mode is disposed in a rear part of a left-hand part of the upper surface 1210 of the body 12. A power switch 1236 for turning on or off the camera 10 is disposed in an upper part of the right side surface 1208 of the body 12. A display 1238 for displaying an image of an object is placed in a rear surface 1204 of the body 12. A menu display switch 1240 and a control switch 1242 are arranged beside the display 1238. The menu display switch 1240 is operated to display a menu. The control switch 1242 is operated to select a desired item included in the menu and to accomplish desired operations. A display control switch 1244 for turning on or off the display 1238, and an image size selector switch 1246 are arranged below the display 1238 on the rear surface 1204 of the body 12.

As shown in FIGS. 2 to 4, the barrel 16 has the shape of a flat rectangular plate having a thickness, a width greater than the thickness, and a height greater than the width. The image pickup device 18 and the photographic optical system 20 are arranged along the length of the barrel 16. The barrel 16 is disposed in the body 12 with its thickness, width and height extended along the thickness, the width and the height of the body 12 of the camera 10, respectively.

The photographic optical system 20 includes the objective lens 22, a reflector 24, a zooming lens unit 2004 including movable lenses, a focusing lens unit 2006, a first fixed lens 2008, a second fixed lens 2010, a third fixed lens 2012, and an aperture stop 2014.

As shown in FIGS. 3 and 4, the objective lens 22 is installed in an upper front part of the barrel 16 with its optical axis extended along the thickness of the barrel 16. The image pickup device 18 is placed at the lower end of the barrel 16 with its image pickup surface facing up. The reflector 24 is disposed behind the objective lens 22 to reflect light traveled through the objective lens 22 toward the image pickup device 18. The first fixed lens 2008, the zooming lens unit 2004, the second fixed lens 2010, the aperture stop 2014, the focusing lens unit 2006, the third fixed lens 2012 are arranged downward in that order with their optical axes aligned with a vertical line.

As shown in FIG. 3, the optical path of the photographic optical system 20 along which an image of an object travels to the image pickup device 18 has a first optical path section 01 horizontally extending through the objective lens 22 to the reflecting surface of the reflector 24, and a second optical path section 02 vertically extending from the reflecting surface of the reflector 24 to the image pickup device 18. The angle between the first optical path section 01 and the second optical path section 02 is 90°. Thus the optical path of the photographic optical system 20 is bent at 90° to form the lens barrel 14 in a small thickness and to form the body 12 of the camera 10 in a thin, small structure.

The movable lenses of the zooming lens unit 2004 and the focusing lens unit 2006 are moved along the optical axis by a driving mechanism incorporated into the barrel 16 for zooming and focusing.

Figure 9:
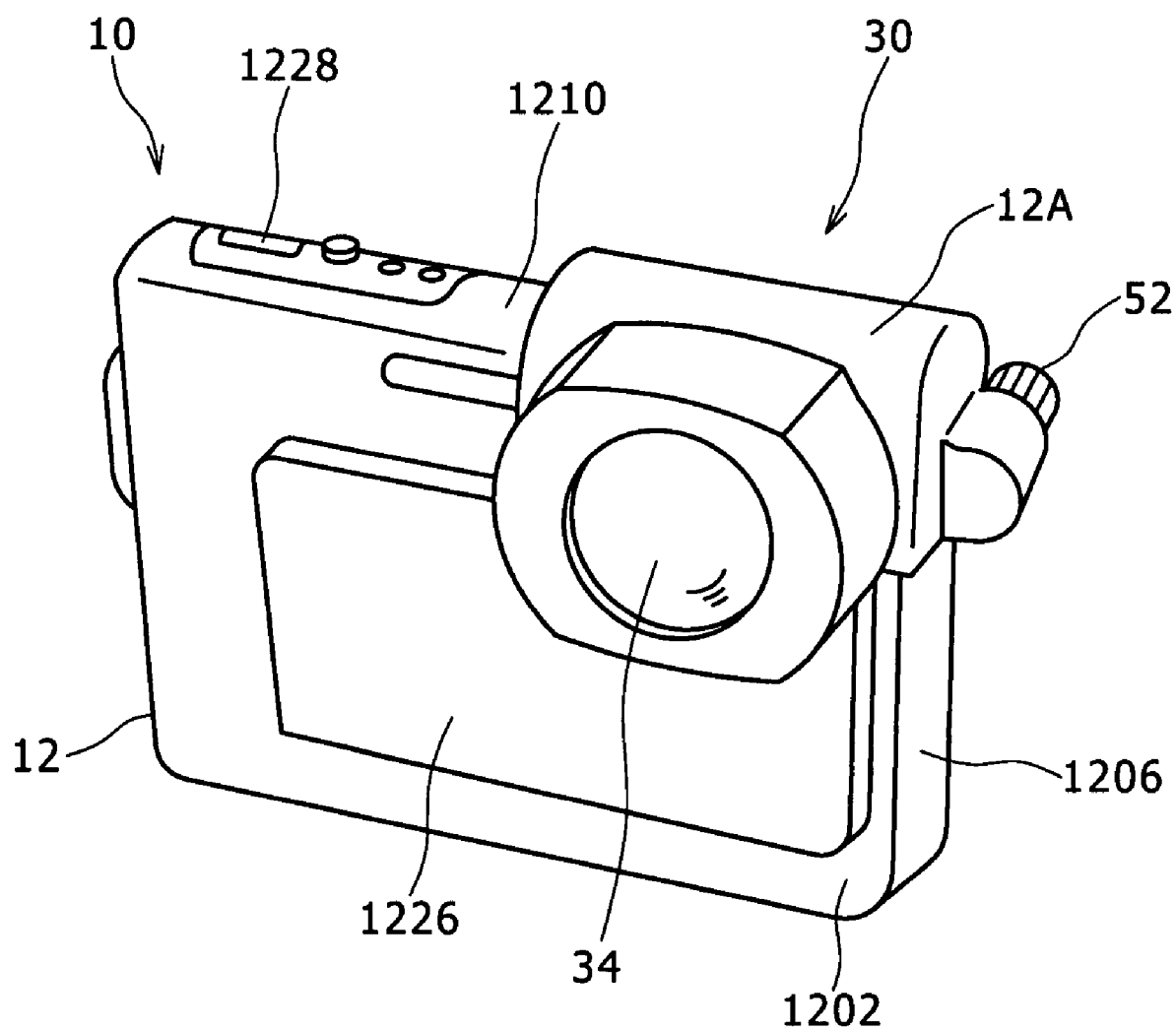
FIG. 9 is a perspective view of the assembly of the camera shown in FIG. 1A and the adapter lens in the first embodiment.
Figure 10:
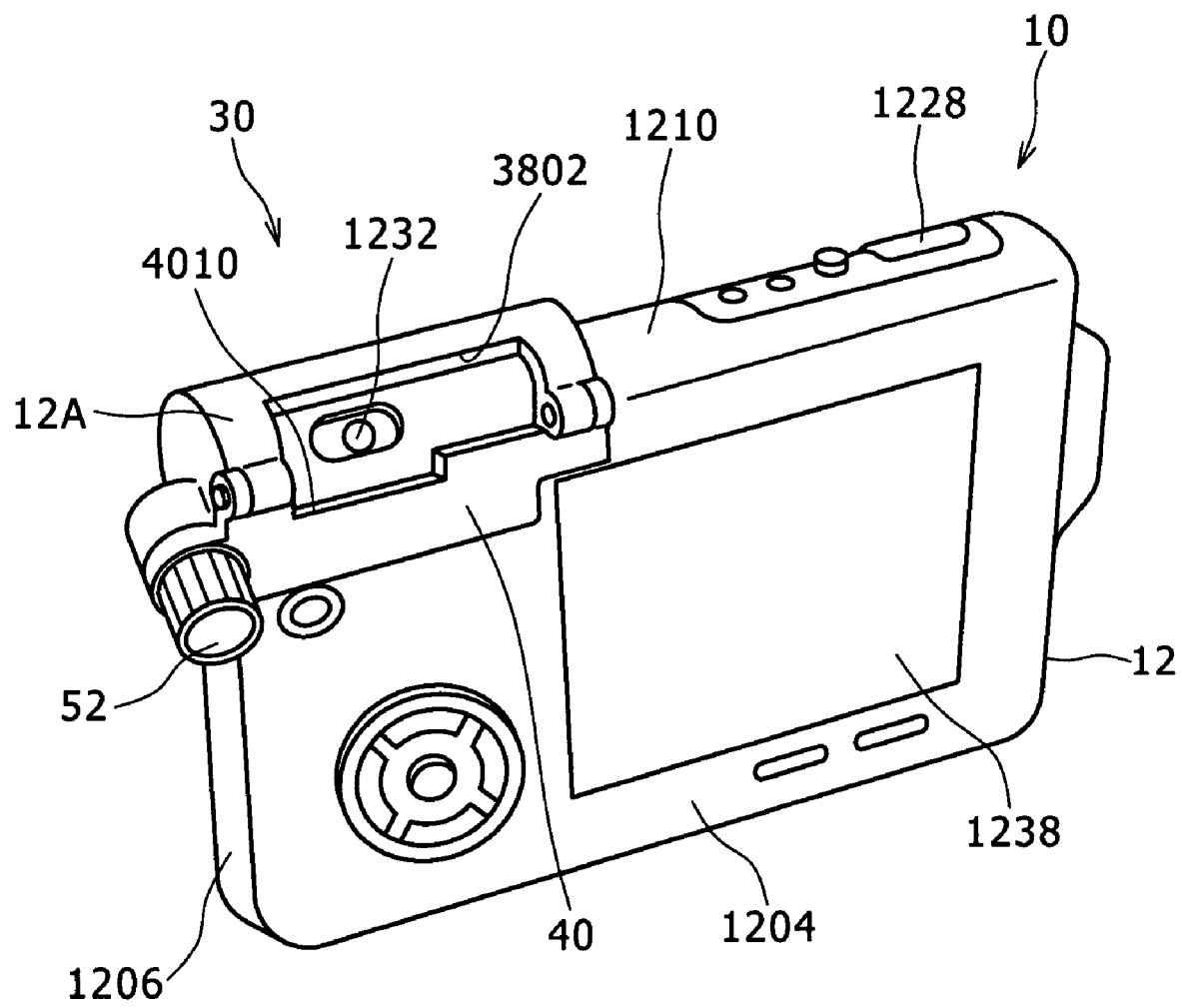
FIG. 10 is a perspective view of the assembly of the camera shown in FIG. 1A and the adapter lens in the first embodiment.
Figure 11:
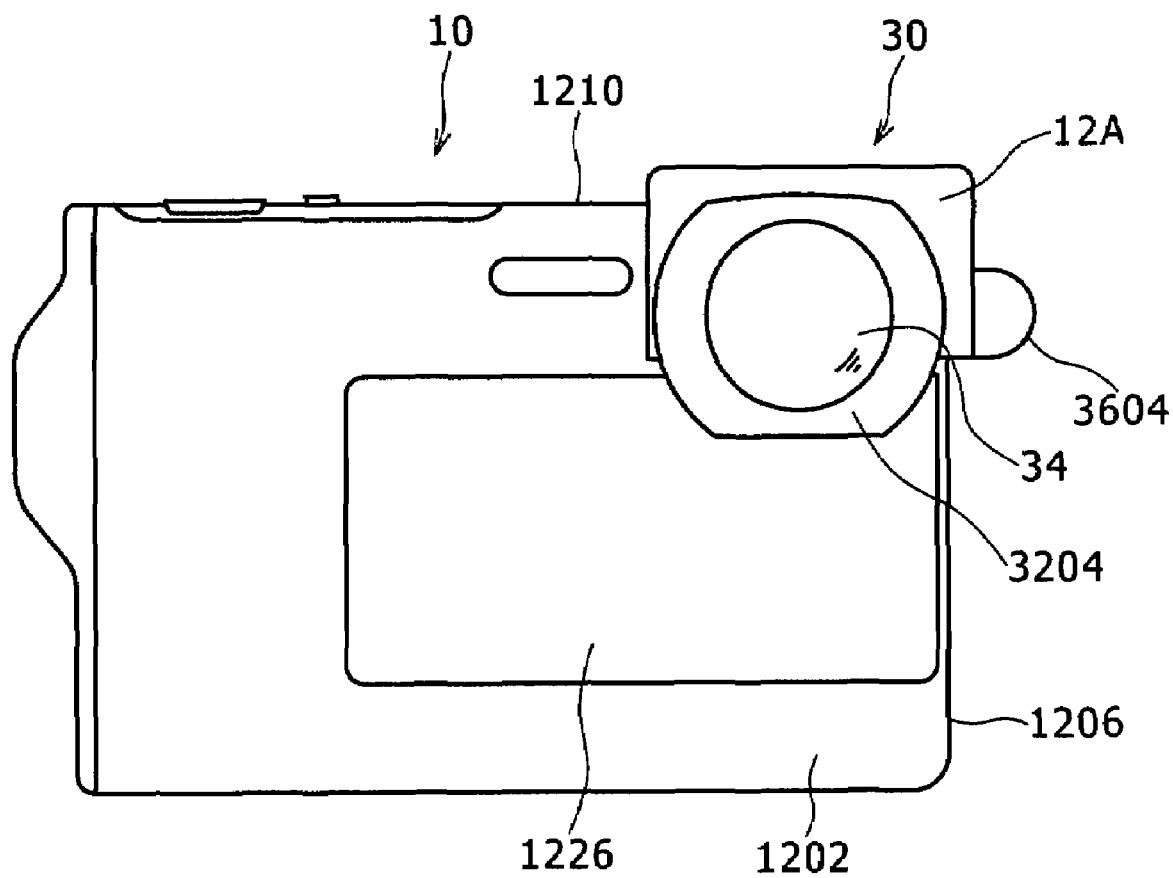
FIG. 11 is a front elevation of the assembly of the camera shown in FIG. 1A and the adapter lens in the first embodiment.
Figure 12:
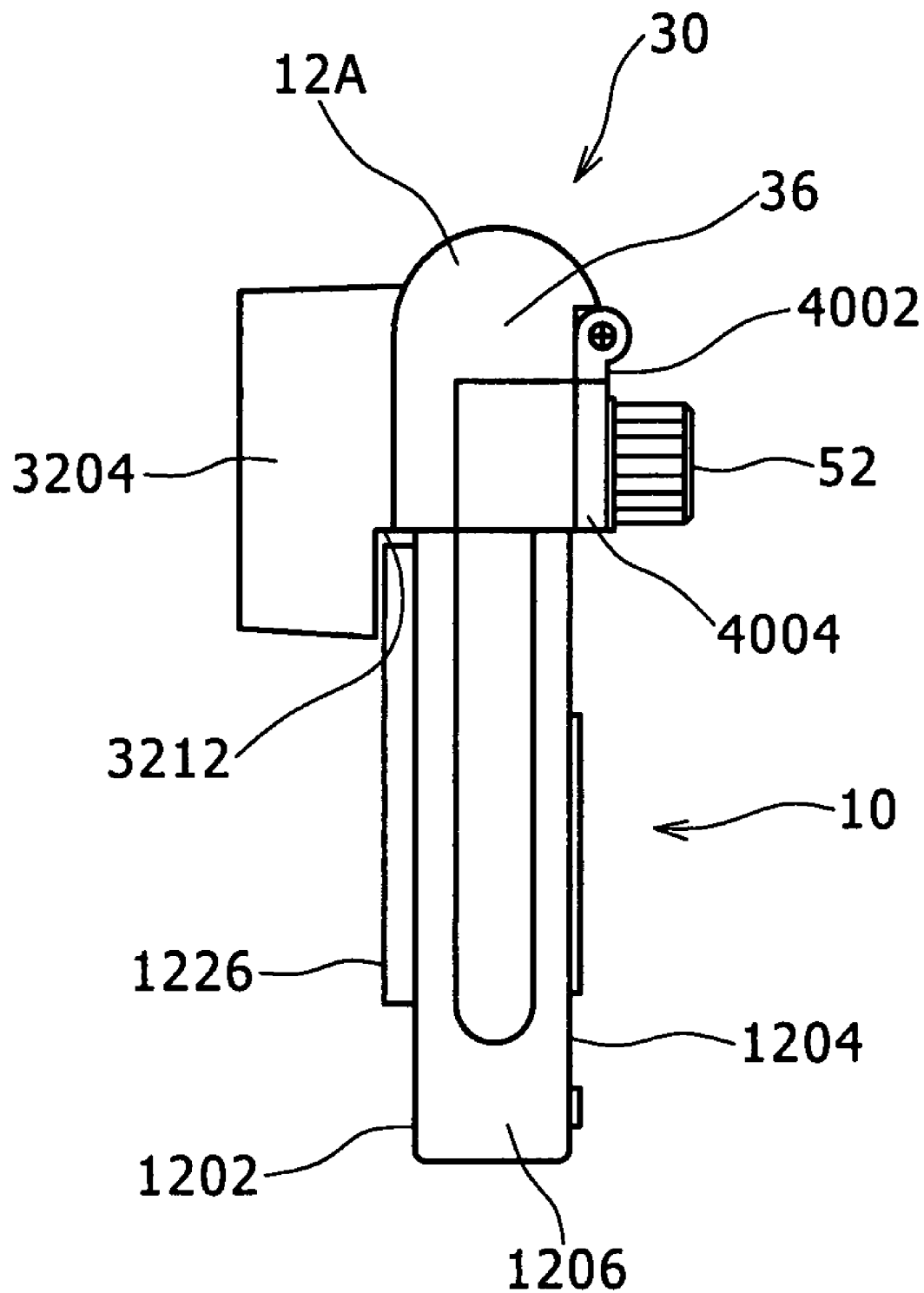
FIG. 12 is a side elevation of the assembly of the camera shown in FIG. 1A and the adapter lens in the first embodiment.
Figure 13:
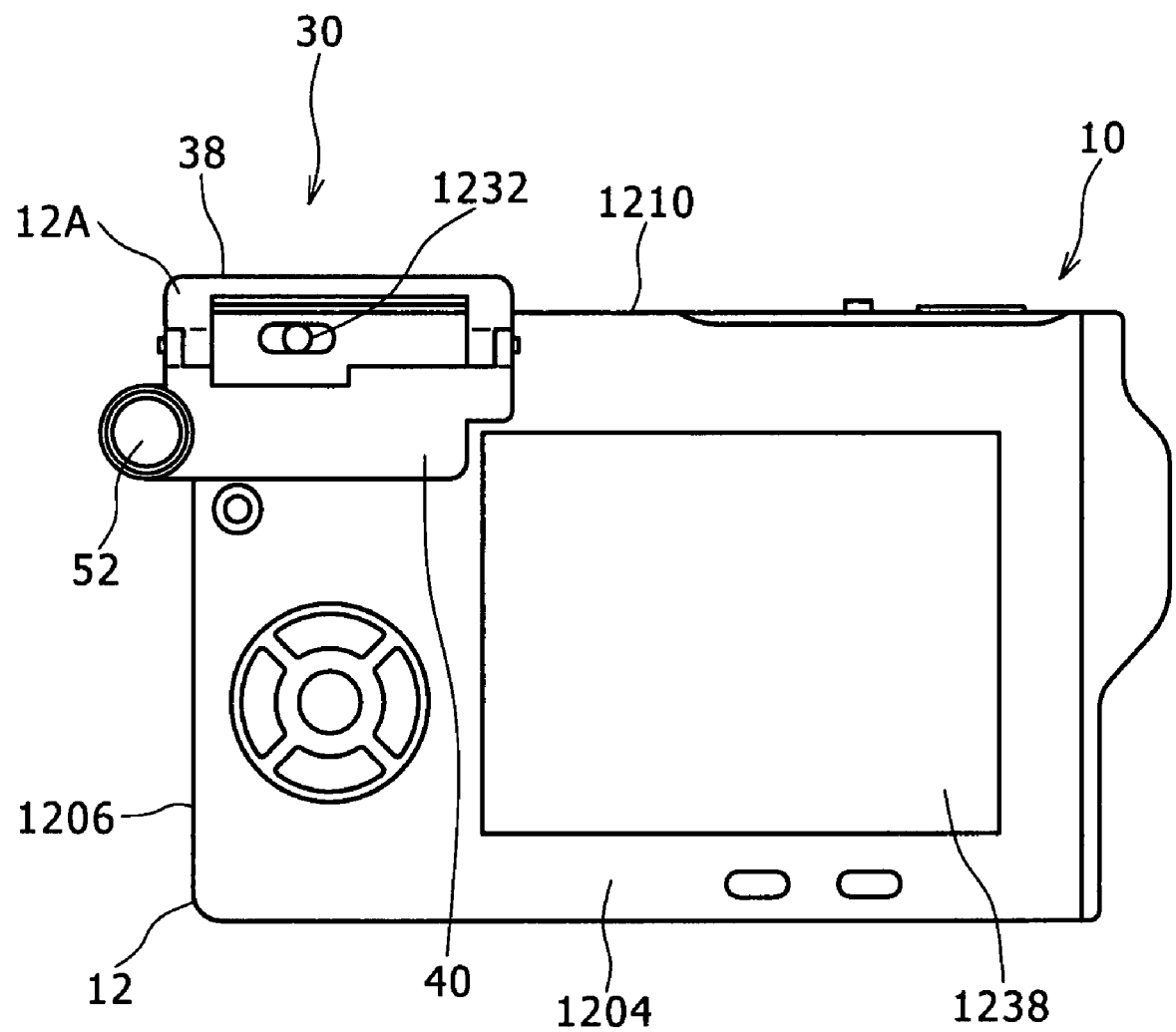
FIG. 13 is a rear view of the assembly of the camera shown in FIG. 1A and the adapter lens in the first embodiment.
Figure 14A:
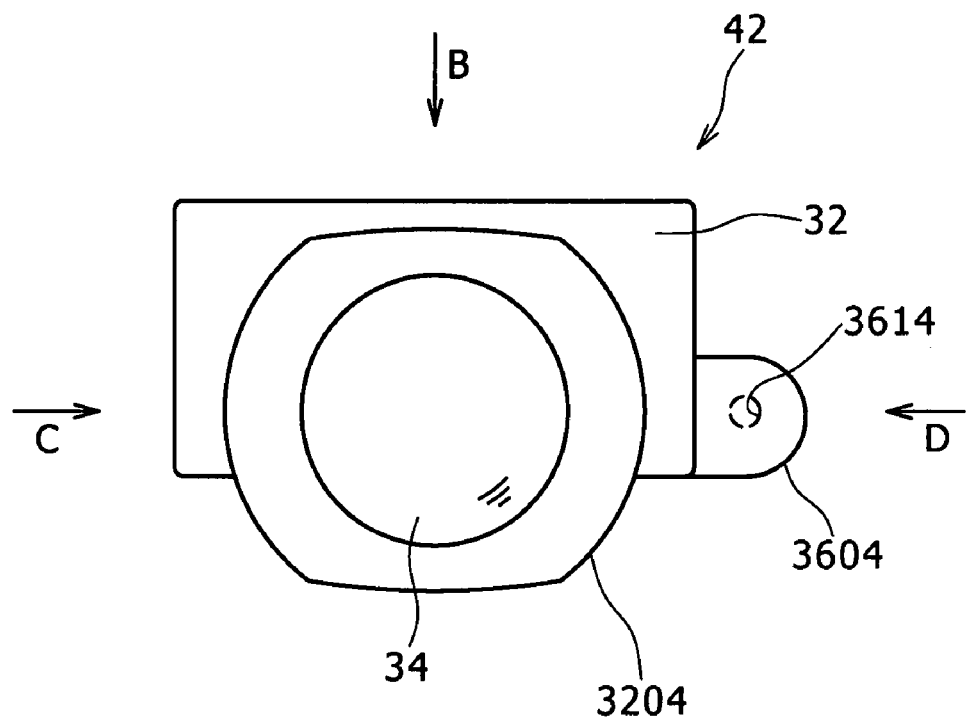
FIG. 14A is a front elevation of an adapter block.
Figure 14B:
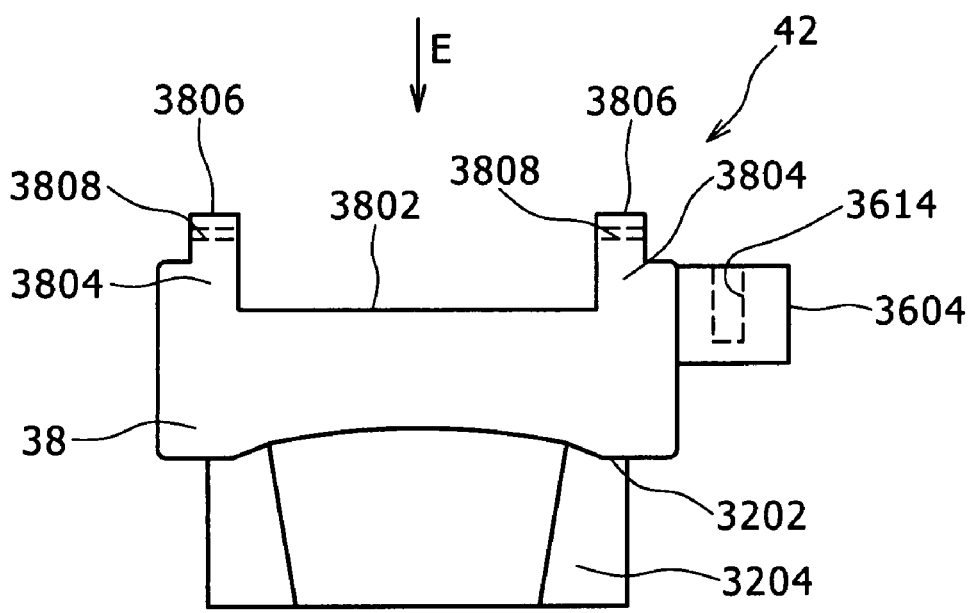
FIG. 14B is a view taken in the direction of the arrow B in FIG. 14A.
Figures 15C, 15D:
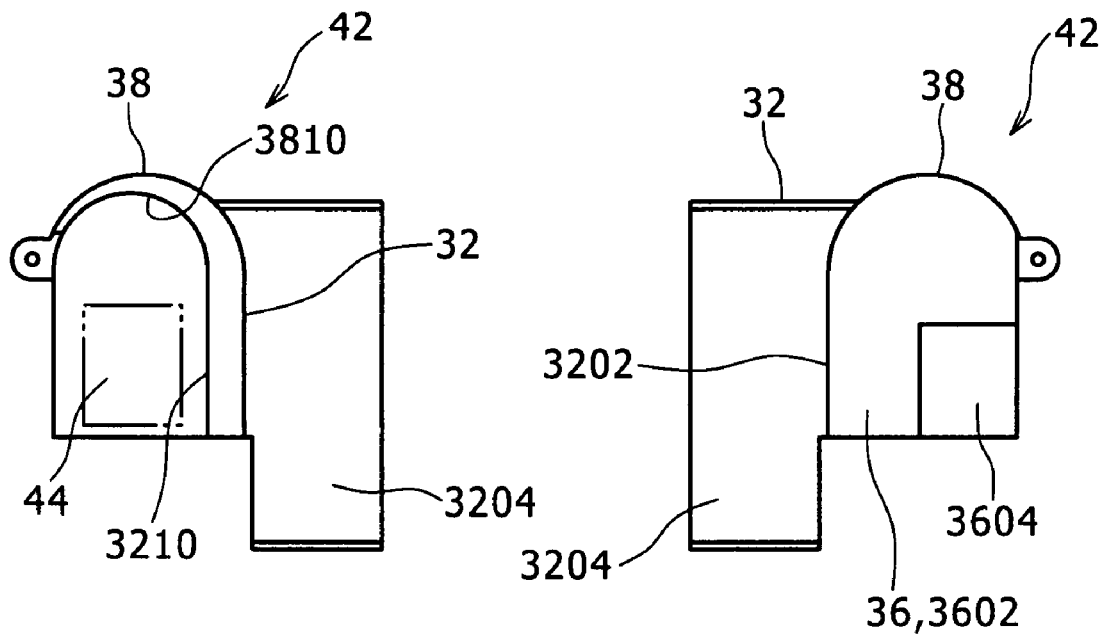
FIG. 15C is a view taken in the direction of the arrow C in FIG. 14A.
FIG. 15D is a view taken in the direction of the arrow D in FIG. 14A.
Figure 15E:
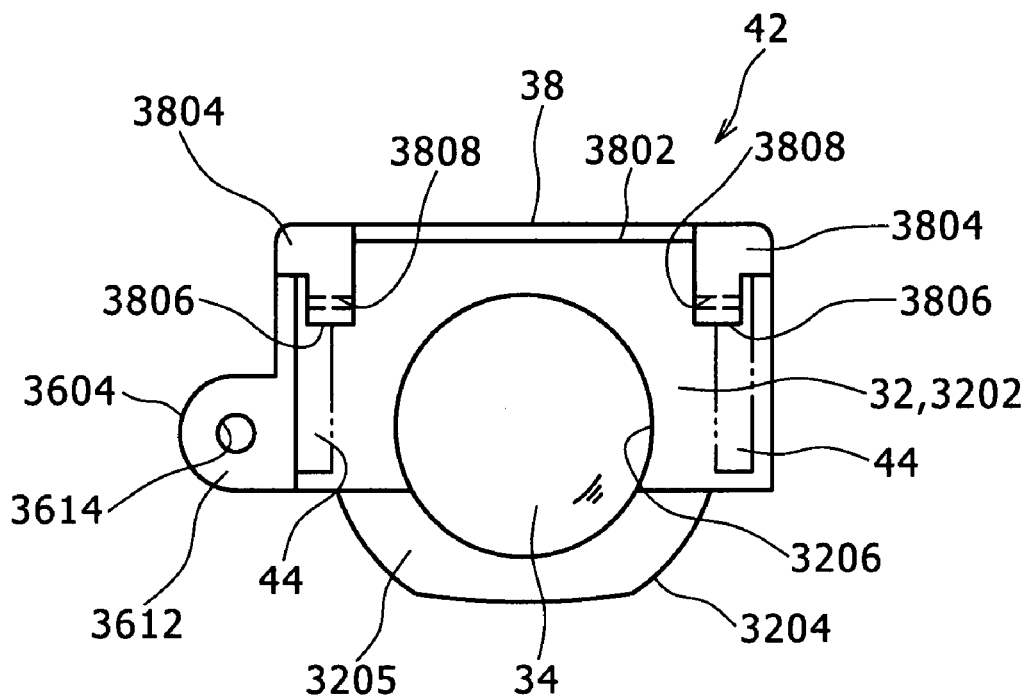
FIG. 15E is a view taken in the direction of the arrow E in FIG. 14B.
Figure 16A:
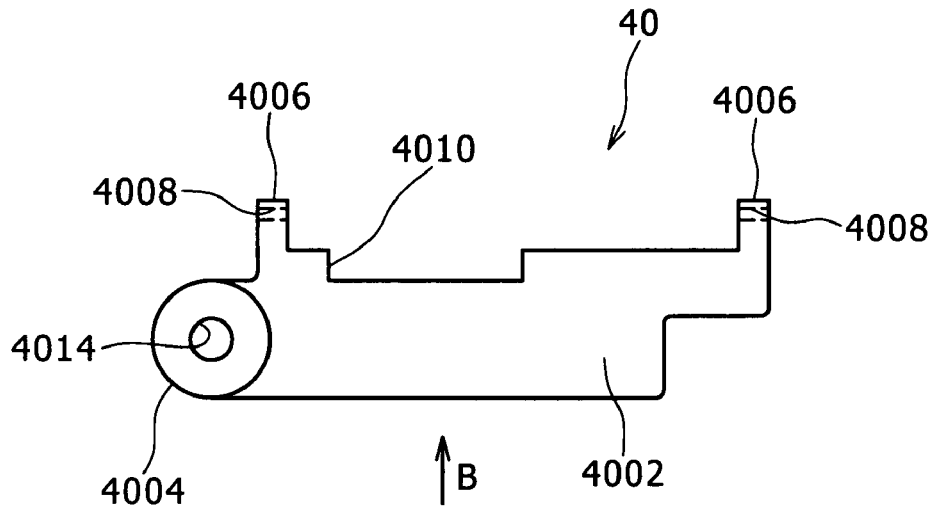
FIG. 16A is a front elevation of a rear plate.
Figure 16B:
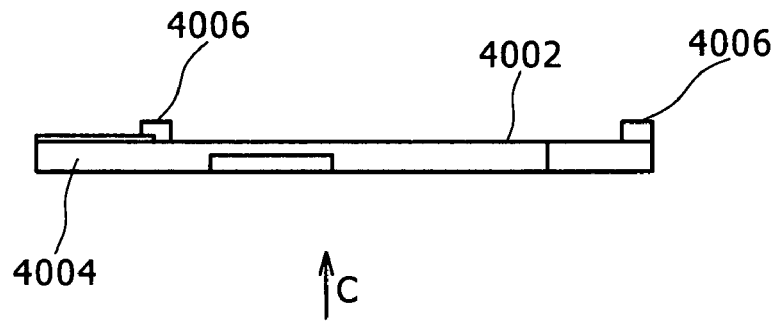
FIG. 16B is a view taken in the direction of the arrow B in FIG. 16A.
Figure 16C:
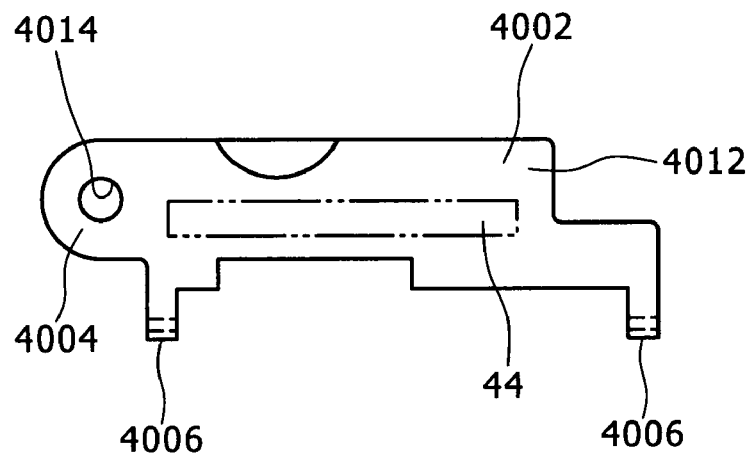
FIG. 16C is a view taken in the direction of the arrow C in FIG. 16B.

The adapter lens 30 in the first embodiment will be described. FIGS. 5 to 8 are perspective views of the adapter lens 30, FIGS. 9 and 10 are perspective views of the assembly of the camera 10 and the adapter lens 30, FIG. 11 is a front elevation of the assembly of the camera 10 and the adapter lens 30, FIG. 12 is a side elevation of the assembly of the camera 10 and the adapter lens 30, FIG. 13 is a rear view of the assembly of the camera 10 and the adapter lens 30, FIG. 14A is a front elevation of an adapter block 42, FIG. 14B is a view taken in the direction of the arrow B in FIG. 14A, FIG. 15C is a view taken in the direction of the arrow C in FIG. 14A, FIG. 15D is a view taken in the direction of the arrow D in FIG. 14A, FIG. 15E is a view taken in the direction of the arrow E in FIG. 14B, FIG. 16A is a front elevation of a rear plate 40, FIG. 16B is a view taken in the direction of the arrow B in FIG. 16A, and FIG. 16C is a view taken in the direction of the arrow C in FIG. 16B.

Referring to FIGS. 9 to 13, the adapter lens 30 can be detachably attached to an upper left-hand corner 12A of the body 12 of the camera 10. As shown in FIGS. 5 to 8, the adapter lens 30 includes a front plate 32, and optical member 34, a side plate 36, an upper plate 38 and a rear plate 40. The front plate 32, the side plate 36 and the upper plate 38 are formed in a unitary structure of aluminum by die casting. The front plate 32, the side plate 36 and the upper plate 38 form an adapter block 42. Similarly, the rear plate 40 is formed of aluminum by die casting.

Figure 6:
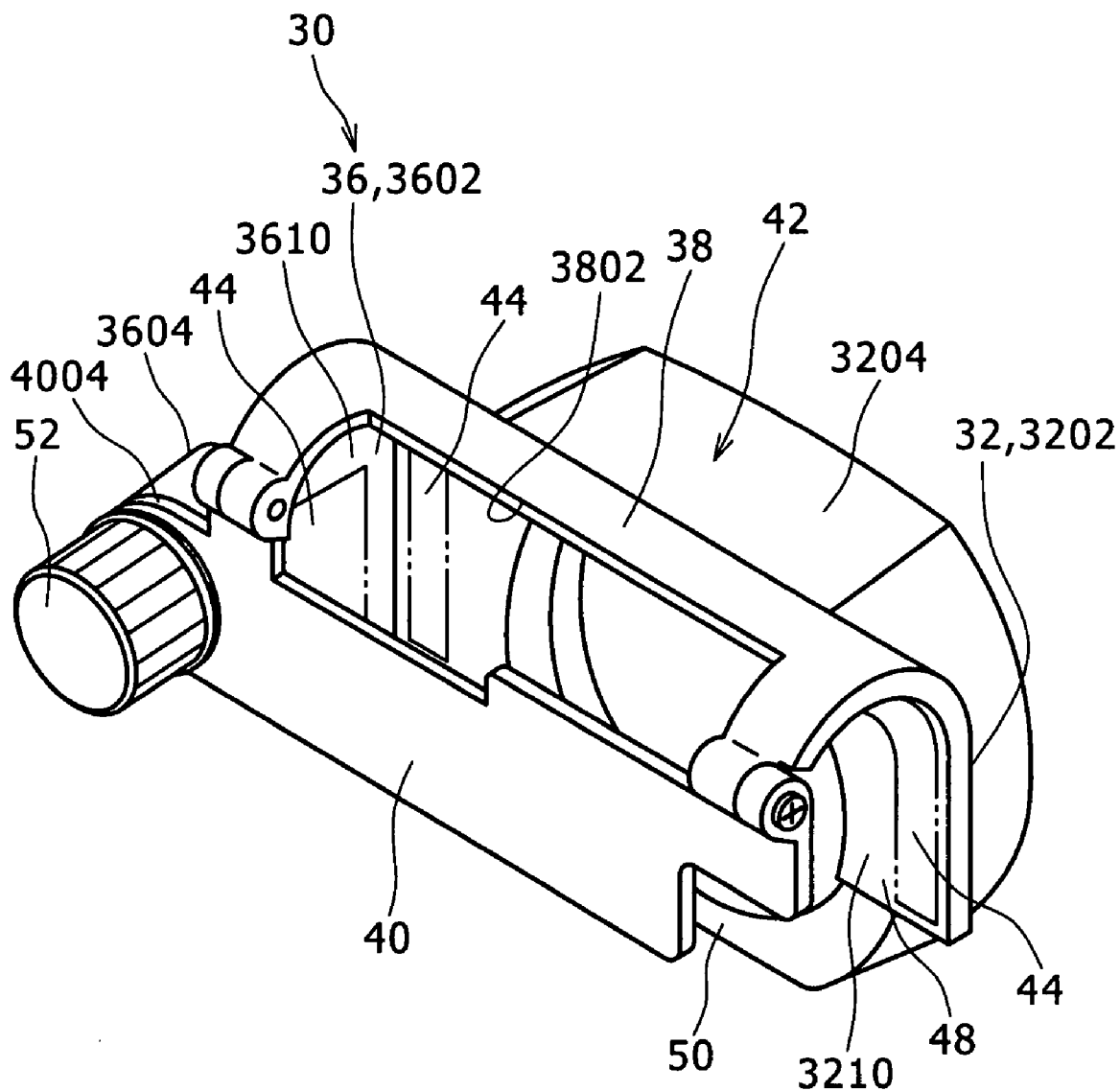
FIG. 6 is a perspective view of the adapter lens in the first embodiment.
Figure 7:
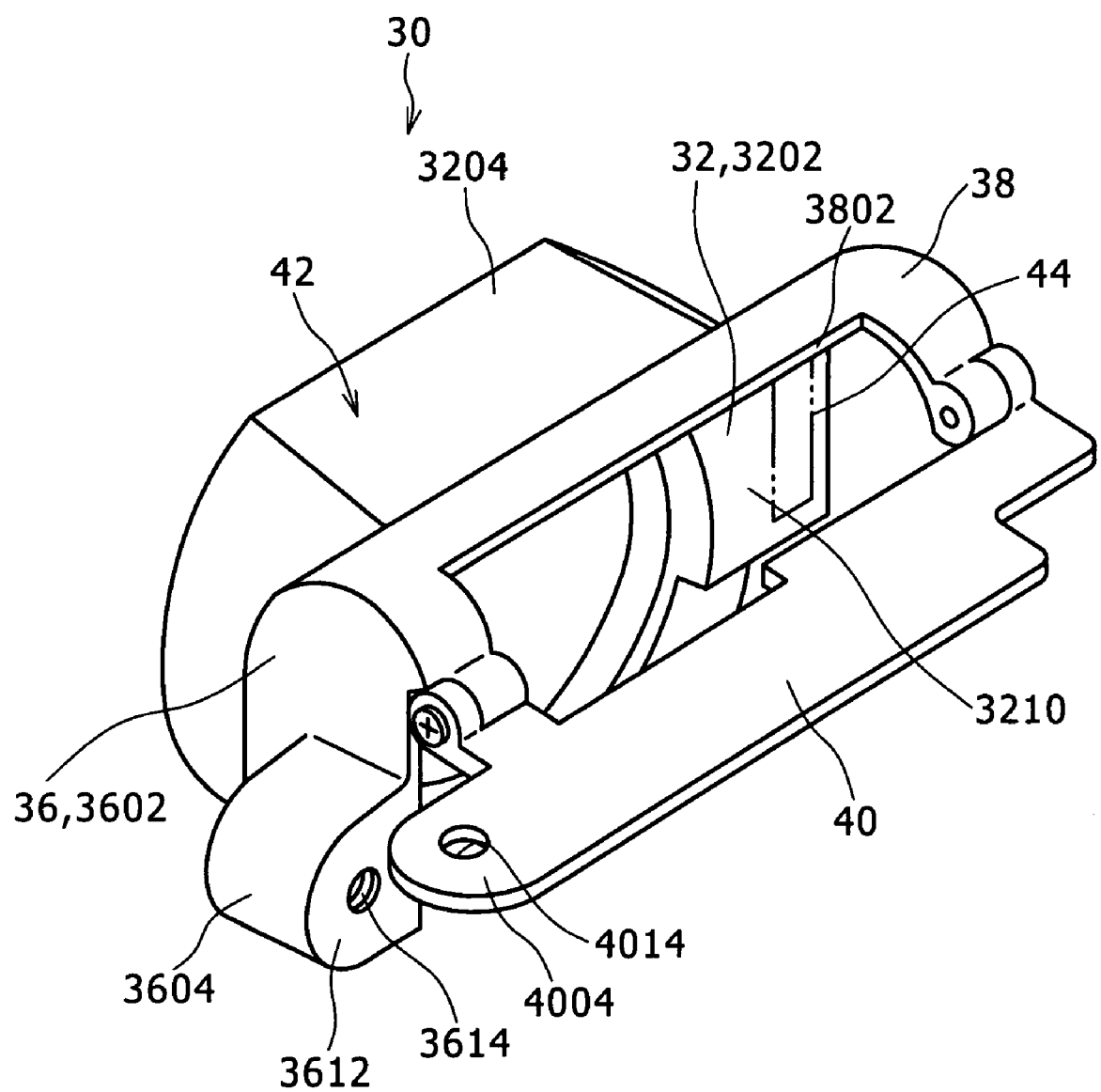
FIG. 7 is a perspective view of the adapter lens in the first embodiment.
Figure 8:
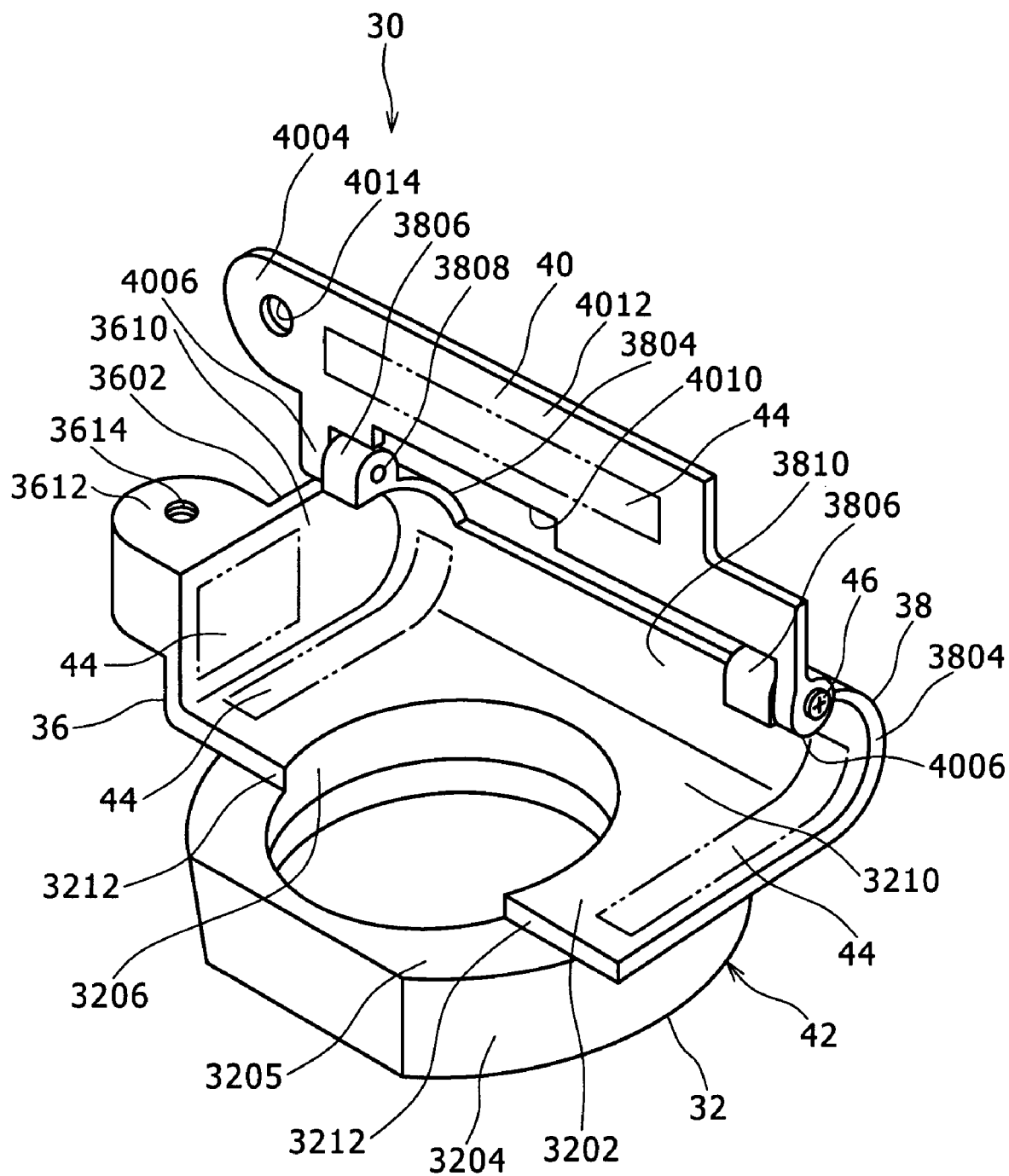
FIG. 8 is a perspective view of the adapter lens in the first embodiment.

As shown in FIGS. 5 to 8, 14 and 15, the front plate 32 has a base part 3202 and a cylindrical part 3204 protruding from the base part 3202. As shown in FIG. 8, the base part 3202 is provided with an opening 3206 of a diameter greater than that of the objective lens 22. The side surface of the opening 3206 is continuous with the inside surface of the cylindrical part 3204. The optical member 34, such as a conversion lens for changing the magnification of the objective lens 22 for wide-angle photography or telephotography, is fitted in a front part of the cylindrical part 3204. Upper and lower parts of the cylindrical part 3204 are gently curved and are formed in the least necessary thickness for supporting the optical member 34. As shown in FIG. 11, the lower end of the front plate 32, namely, the lower end of the cylindrical part 3204, is slightly lower than the lower end of the optical member 34.

As shown in FIGS. 6 to 8, the inner surface 3210 of the base part 3202 is formed in a size such that the inner surface 3210 corresponds only to an area surrounding the objective lens 22 of the front surface 1202 of the body 12. Thus unnecessary parts are omitted to the least possible extent to miniaturize the lens adapter 30.

Elastic members 44 having the shape of a thin strip are attached to parts, on the opposite sides of the opening 3206, of the inner surface 3210. The elastic members 44 come into elastic contact with the front surface 1202 of the body 12. Thus the inner surface 3210 of the base part 3202 comes into contact with the front surface 1202 of the body 12 through the elastic members 44. The elastic members 44 are made of a material that will not damage the surface of the body 12 and will be slightly deformed by external force, such as an elastomer.

As shown in FIG. 8, the lower edges 3212 of the base part 3202 are slightly higher than the lower end of the cylindrical part 3204. When the adapter lens 30 is mounted on the camera 10, a space is formed between the front surface 1202 of the body 12 and the rear surface of a lower part of the cylindrical part 3204. When the barrier 1226 is raised to the upper position, an upper part of the barrier 1226 is received in the space formed between the front surface 1202 of the body 12 and the rear surface of a lower part of the cylindrical part 3204 as shown in FIG. 12. Thus the barrier 1226 can be freely moved between the upper and the lower position.

The side plate 36 is continuous with the left end of the front plate 32. More specifically, the side plate 36 extends rearward from the left end of the base part 3202. A boss 3604 projects to the left from the side plate 36.

As shown in FIG. 8, the lower edges 3212 of the base part 3202 and the lower edge of the side plate 36 are on the same horizontal plane to improve the aesthetic appearance of the adapter lens 30. The lower edge of the side plate 36 is slightly higher than the lower end of the cylindrical part 3204. The inner surface 3210 of the base part 3202 has an area that comes into contact with only an upper part of the left side surface 1206 near the corner 12A of the body 12. Thus unnecessary parts are omitted to the least possible extent to miniaturize the lens adapter 30.

An elastic member 44 having the shape of a thin strip is attached to the inner surface 3610 of a base part 3602 of the side plate 36. The elastic members 44 comes into elastic contact with an upper part of the left side surface 1206 of the body 12; that is the inner surface 3610 of the base part 3602 comes into contact with the left side surface 1206 of the body 12 through the elastic member 44. Thus the inner surface 3210 of the base part 3202. A threaded hole 3614 is formed in the rear surface 3612 of the boss 3604.

The upper plate 38 extends rearward from an upper part of the front plate 32. A left part of the upper plate 38 is connected to an upper part of the side plate 36. The upper plate 38 is formed in an upward convex cylindrical shape conforming to the upper surface 1210 of the body 12. As shown in FIGS. 6 and 10, a laterally elongate recess 3802 is formed in a rear half part of the upper plate 38 to define an opening corresponding to a part of the upper surface 1210 of the body 13 in which the mode selector switch 1232 is disposed. The mode selector switch 1232 is exposed in the opening. The recess 3802 opens toward the rear edge of the upper plate 38. Since the recess 3802 is formed in the rear half part of the upper plate 38, the rear half part of the upper plate 38 has two arms 3804 extending rearward from the opposite ends of a front half part of the upper plate 38 as shown in FIGS. 8, 14B and 15E. Cylindrical knuckles 3806 respectively provided with through holes 3808 are formed at the extremities of the arms 3804, respectively.

As shown in FIG. 8, upper parts of the elastic members 44 attached to the base part 3202 of the front plate 32 extend upward and are attached to the inner surface 3810 of the front half part of the upper plate 38. The upper plate 38 is formed in a size such that the upper plate 38 comes into contact with only a part near the corner 12A of the upper surface 1210 of the body 12. Thus unnecessary parts are omitted to the least possible extent to miniaturize the lens adapter 30. The elastic member 44 attached to the inner surface 3810 of the upper plate 38 come into elastic contact with parts near the corner 12A of the upper surface 1210 of the body 12; that is the inner surface 3810 of the upper plate 38 comes into contact with parts of the upper surface 1210 of the body 12 near the corner 12A through the elastic member 44.

The rear plate 40 is connected to the rear part of the upper plate 38 so as to be swingable as shown in FIGS. 6 to 8. Referring to FIGS. 16A to 16C, the rear plate 40 has a laterally elongate base part 4002 and a joining part 4004 laterally projecting from the left end of the base part 4002. As shown in FIG. 12, the lower edge of the base part 4002 and the lower edge of the side plate 36 are flush with each other, which improves the aesthetic appearance of the adapter lens 30. Knuckles 4006 respectively provided with through holes 4008 project upward from right and left parts of the upper edge of the base part 4002, respectively. The knuckles 4006 have a cylindrical shape coinciding with that of the knuckles 3806 of the upper plate 38. The through holes 4008 of the knuckles 4006 are aligned with the through holes 3808 of the knuckles 3806. As shown in FIG. 8, the knuckles 4006 of the rear plate 40 is aligned with the knuckles 3806 of the upper plate 38 and pivot pins 46 are inserted into the through holes 3808 and 4008 to join the rear plate 40 swingably to the upper plate 38. The joining part 4004 is provided with a through hole 4014 that can be aligned with the threaded hole 3614 of the boss 3604. As shown in FIGS. 10 and 16A, a recess 4010 is formed in a left half part of the upper edge of the base part 4002 to facilitate operating the mode selector switch 1232. The rear plate 40 is formed in a size such that the rear plate 40 comes into contact with only an upper part of the rear surface 1204 near the corner 12A of the body 12. Thus unnecessary parts are omitted to the least possible extent to miniaturize the lens adapter 30.

As shown in FIG. 8, an elastic member 44 is attached to the inner surface 4012 of the base part 4002. The elastic member 44 comes into elastic contact with a part of the rear surface 1204 of the body 12 near the corner 12A; that is the inner surface 4012 of the base part 4002 comes into contact with the part of the rear surface 1204 of the body 12 near the corner 12A through the elastic member 44.

As shown in FIG. 6, a side opening 48 is defined by the respective right ends of the front plate 32 opposite the side plate 36, the upper plate 38 and the rear plate 40. A lower opening 50 is defined by the respective lower ends of the front plate 32, the side plate 36 and the rear plate 40.

Referring to FIGS. 9 to 13, the adapter lens 30 is mounted on the camera 10 with the front plate 32 in contact with a part of the front surface 1202 around the objective lens 22, the side plate 36 in contact with an upper part of the side surface 1206 near the corner 12a of the body 12, the upper plate 38 in contact with a part of the upper surface 1210 near the corner 12A of the body 12 and the rear plate 40 in contact with an upper part of the rear surface 1204 near the corner 12A of the body 12. When the adapter lens 30 is thus mounted on the camera 10, the optical axis of the optical member 34 is aligned with the optical axis of the objective lens 22. A screw 52 is passed through the through hole 4014 of the joining part 4004 and is screwed into the threaded hole 3614 of the boss 3612 to hold the body 12 between the front plate 32 and the rear plate 40.

The adapter lens 30 in the first embodiment covers only the upper left-hand corner 12A of the body 12 of the camera 10. Therefore, the assembly of the camera 10 and the adapter lens 30 is not large and hence the camera 10 is easy to operate. The adapter lens 30 in the first embodiment does not cover parts of the body 12 other than the upper left-hand corner 12A of the body 12 of the camera 10. Therefore, the adapter lens 30 looks compact and has an excellent external appearance.

Second Embodiment

Figure 17:
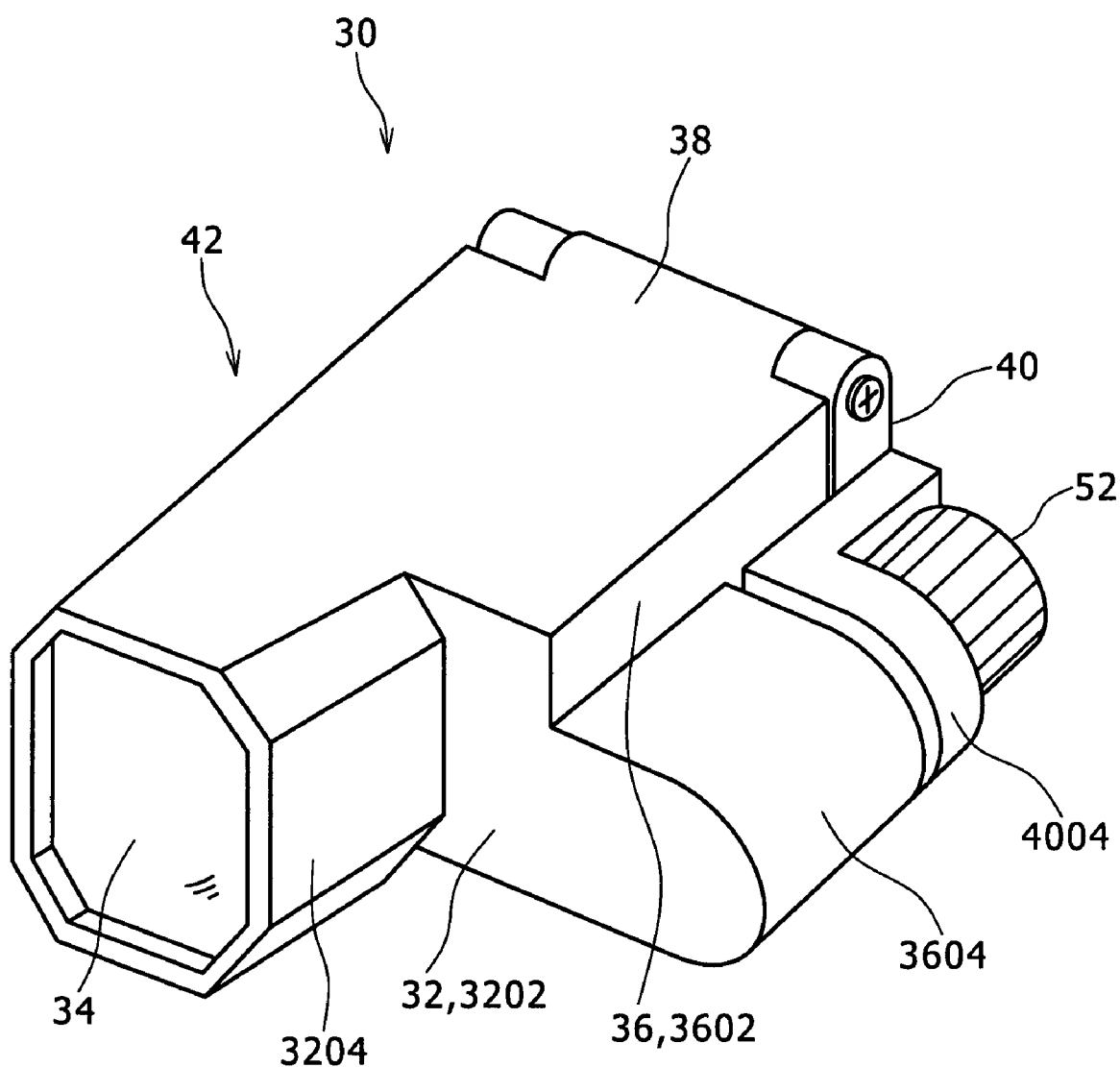
FIG. 17 is a perspective view of an adapter lens in a second embodiment according to the present invention.
Figure 18:
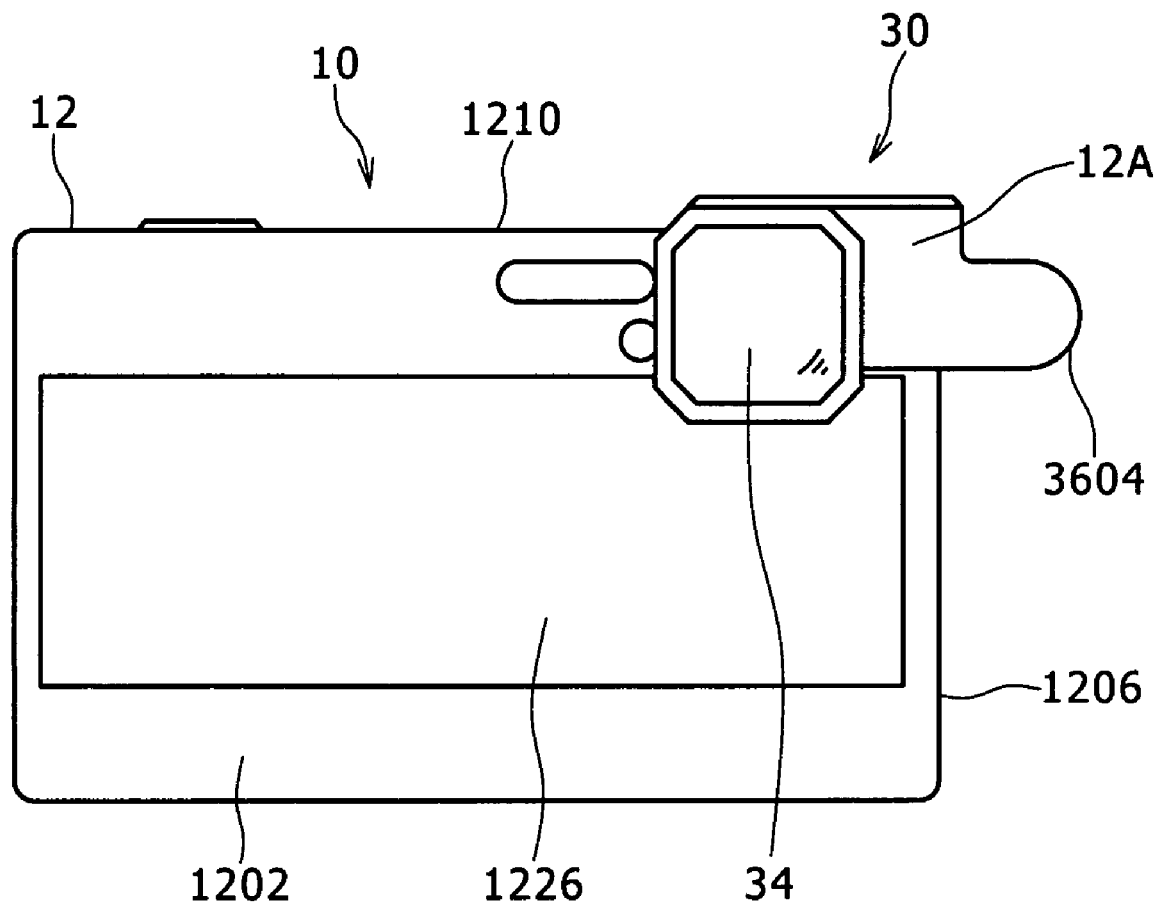
FIG. 18 is a front elevation of the adapter lens shown in FIG. 17 mounted on the camera.
Figure 19:
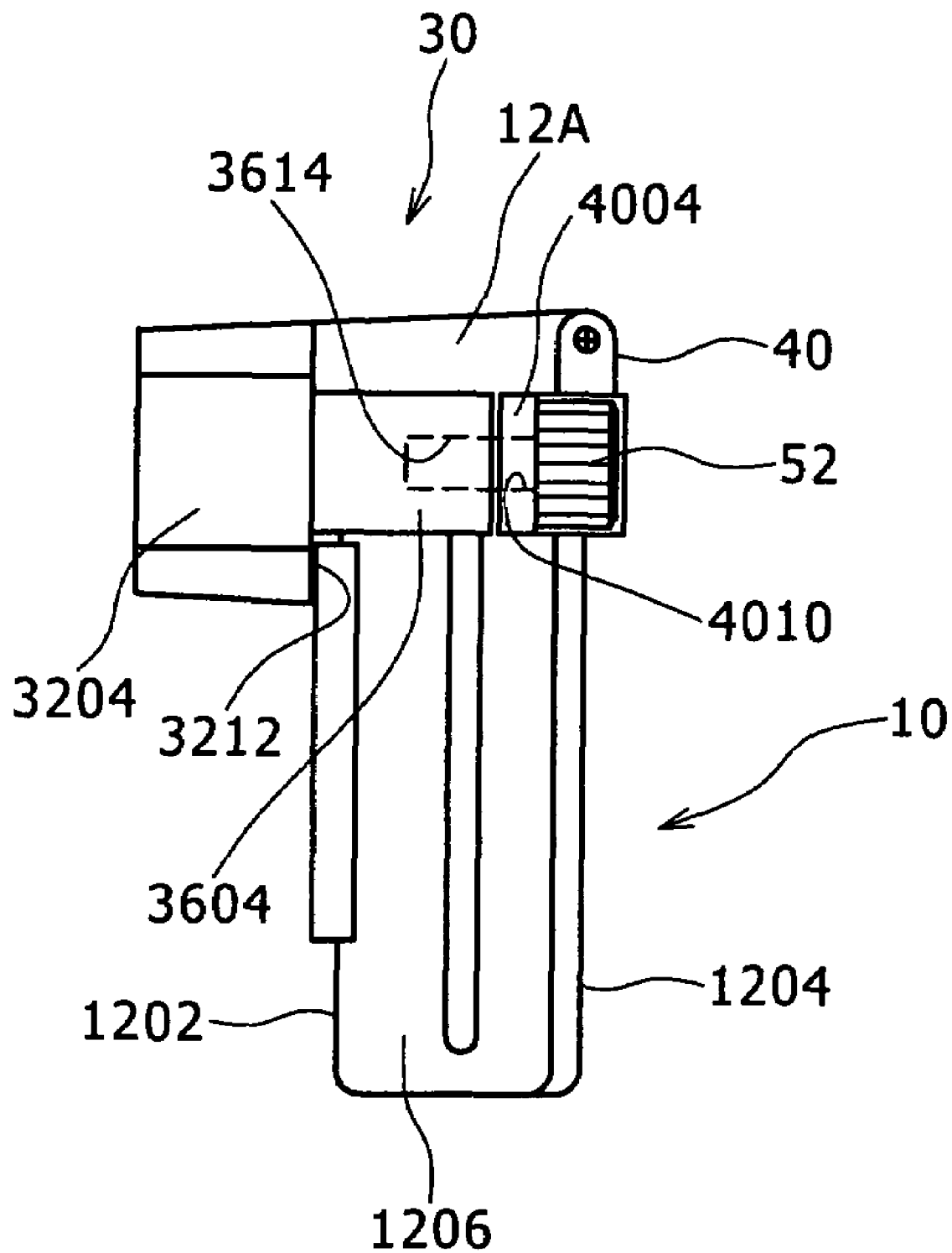
FIG. 19 is a side elevation of the adapter lens shown in FIG. 17 mounted on the camera.
Figure 20:
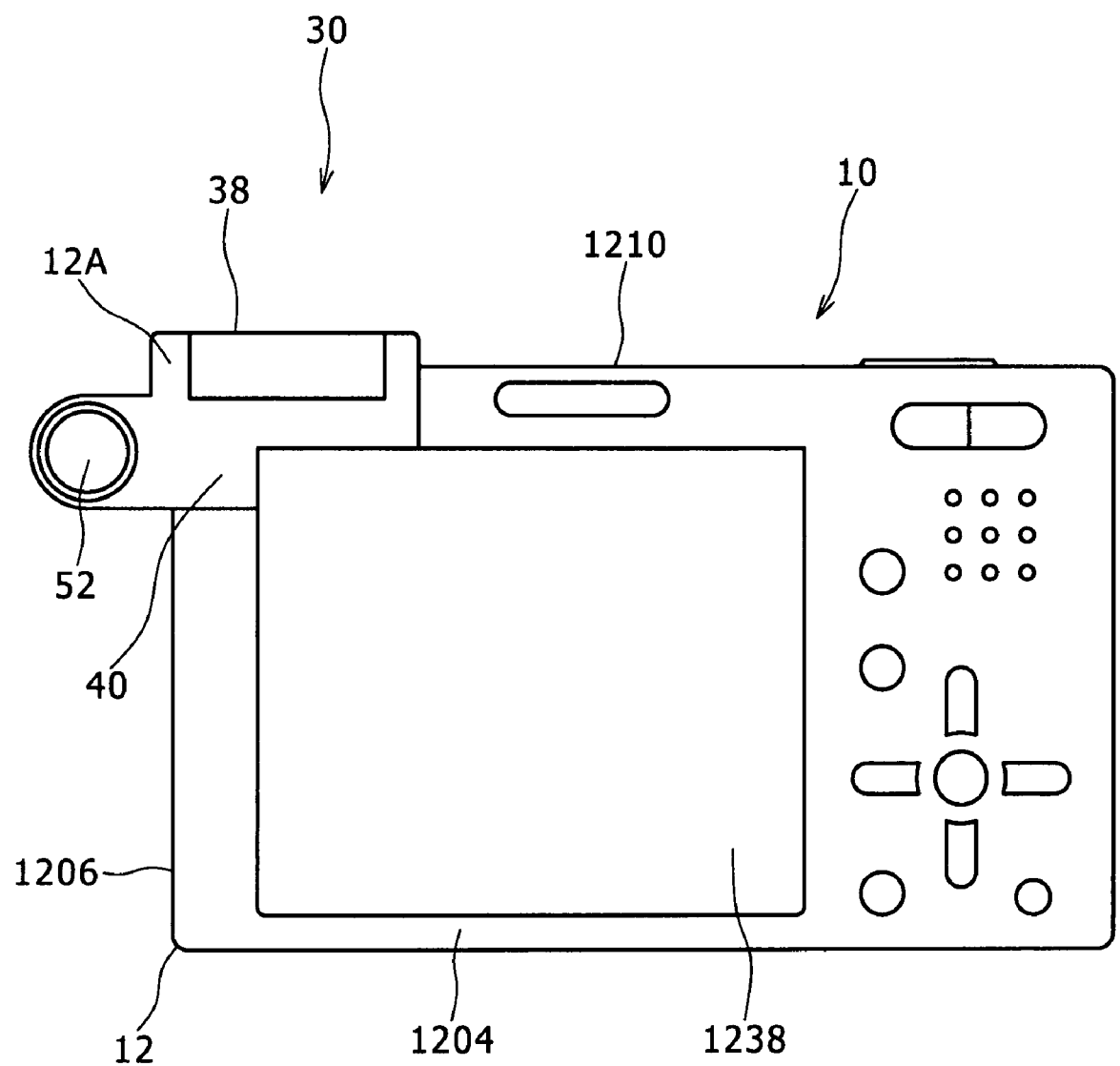
FIG. 20 is a rear view of the adapter lens shown in FIG. 17 mounted on the camera.

An adapter lens 30 in a second embodiment according to the present invention will be described with reference to FIGS. 17 to 20, in which parts like or corresponding to those of the adapter lens 30 in the first embodiment are designated by the same reference characters. FIG. 17 is a perspective view of the adapter lens 30 in the second embodiment, FIG. 18 is a front elevation of the adapter lens 30 mounted on a camera 10, FIG. 19 is a side elevation of the adapter lens 30 mounted on the camera 10, and FIG. 20 is a rear view of the adapter lens 30 mounted on the camera 10.

The adapter lens 30 in the second embodiment has a side plate 36 having a base part 3602 provided with a boss 3604, and a rear plate 40 having a base part 4002. The boss 3604 is provided with a threaded hole 3614 and has a rear end surface lying on the front side of the rear end of a side plate 36. The rear plate 40 has a base part 4002 provided with a joining part 4004 provided with a through hole 4014. The joining part 4004 lies on the front side of the base part 4002. When a screw 52 is passed through the through hole 4014 of the joining part 4004 and screwed into the threaded hole 3614 of the boss 3604. The rear end surface of the head of the screw 52 is flush with the outer surface of the rear plate 40.

The adapter lens 30 in the second embodiment has effects similar to those of the adapter lens 30 in the first embodiment, and has an improved external appearance because the rear end surface of the head of the screw 52 fastening the joining part 4004 to the boss 3604 is flush with the outer surface of the rear plate 40.

The elastic members 44 may be omitted. However, the elastic members 44 attached to the front plate 32, the side plate 36, the upper plate 38 and the rear plate 40 have the advantage of preventing the body 12 of the camera 10 from scratches when the adapter lens 30 is mounted on the camera 10.

The optical member 34 is not limited to the conversion lens and may be a member other than the conversion lens, such as an optical filter.

The optical member 34 does not need to be attached to the front part of the cylindrical part 3204. An internal thread may be formed in the front part of the cylindrical part 3204 and the optical member 34 may be screwed in the threaded front part of the cylindrical part 3204.

The adapter lens 30 of the embodiment of the present invention is applicable also to a mobile telephone with a camera or a portable electronic device with a camera.

It should be understood by those skilled in the art that various modifications, combinations, sub-combinations and alternatives may occur depending on design requirements and other factors insofar as they are within the scope of the appended claims or the equivalent thereof.

What is claimed is:

1. An adapter lens capable of being detachably attached to a corner of a thin, rectangular body included in a camera provided with an objective lens disposed in an upper corner of a front wall of the body, the adapter lens comprising:
   a front plate capable of being brought into contact with a part of the front wall of the body around the objective lens
   an optical member attached to the front plate;
   a side plate connected to a side part of the front plate and capable of being brought into contact with an upper part of the side surface of the body near the upper corner;
   an upper plate connected to an upper part of the front plate and capable of being brought into contact with a part of the upper surface of the body near the upper corner; and
   a rear plate connected to a rear part of the upper plate so as to be swingable and capable of being brought into contact with an upper part of the rear surface of the body near the upper corner;
   wherein a side part of the front plate opposite the side plate, a side part of the upper plate and a side part of the rear plate define a side opening, opening in a lateral direction, a lower part of the front plate, a lower part of the side plate and a lower part of the rear plate define a lower opening, opening downward, the front plate is brought into contact with the part of the front wall of the body around the objective lens, the side plate is brought into contact with the upper part of the side surface of the body, the upper plate is brought into contact with the part of the upper surface of the body near the upper corner, and the rear plate is brought into contact with the upper part of the rear surface of the body near the corner part when the lens adapter is mounted on the camera an optical axis of the optical member is aligned with an optical axis of the objective lens when the adapter lens is mounted on the camera, the side plate is provided with a laterally projecting boss provided with a threaded hole in its rear surface, the rear plate has a joining part which coincides with the boss when the adapter lens is mounted on the camera, and a screw is screwed through the opening of the joining part into the threaded hole of the boss to hold the lens adapter on the camera.

2. The adapter lens according to claim 1, wherein elastic members each having the shape of a thin plate are attached to parts of the front plate to be brought into contact with the part of a front surface of the body around the objective lens, a part of the side plate to be brought into contact with the upper part of the side surface of the body, parts of the upper plate to be brought into contact with the parts of the upper surface of the body near the upper corner, and a part of the rear plate to be brought into contact with the upper part of the rear surface of the body near the upper corner, respectively.

3. The adapter lens according to claim 1, wherein respective lower edges of the side plate and the rear plate lie at a level higher than that at which a lower end of the front plate lies.

4. The adapter lens according to claim 1, wherein a lower end of the front plate is slightly lower than the optical member, respective lower edges of the side plate and the rear plate are at the same level higher than a level at which the lower end of the front plate lies.

5. The adapter lens according to claim 1, wherein the front plate has a base part capable of being coming into contact with the part of a front surface of the body around the objective lens, and a cylindrical part protruding forward from the base part and holding the optical member, the base part is provided with an opening of a diameter greater than that of the objective lens, and the side surface of the opening of the base part is continuous with an inside surface of the cylindrical part.

6. The adapter lens according to claim 5, wherein the lower end of the cylindrical part is slightly lower than the optical member, the respective lower edges of the base part, the side plate and the rear plate are flush with each other and higher than the lower end of the cylindrical part.

7. The adapter lens according to claim 6, wherein an upper part of a barrier placed on the body is received in a space between a part of the cylindrical part projecting downward from the lower edges of the base part of the front plate, and a front surface of the body when the adapter lens is mounted on the camera.

8. The adapter lens according to claim 1, wherein the upper plate is provided with a laterally elongate opening to expose a part of an upper surface of the body.

9. The adapter lens according to claim 1, wherein the front plate, the side plate and the upper plate are integrated into a unitary structure of aluminum by die casing, and the rear plate is formed of aluminum by die casting.

10. The adapter lens according to claim 1, wherein the boss has a rear end surface lying on the front side of the rear end of the side plate, the joining part lies on the front side of the rear plate, and a rear end surface of a head of a screw is flush with an outer surface of the rear plate when the screw is passed through the through hole of the joining part and screwed into the threaded hole of the boss.

11. The adapter lens according to claim 1, wherein the front plate is formed in a size such that the front plate comes into contact with only a part of a front surface of the body around the objective lens, the side plate is formed in a size such that the side plate comes into contact with only an upper part of a side surface of the body near an upper corner of the body, the upper plate is formed in a size such that the upper plate comes into contact with only a part of an upper surface of the body near the upper corner of the body, and the rear plate is formed in a size such that the rear plate comes into contact with only an upper part of a rear surface of the body near the upper corner of the body.

* * * * *